US012042066B2

(12) United States Patent
Calon et al.

(10) Patent No.: US 12,042,066 B2
(45) Date of Patent: Jul. 23, 2024

(54) DISPLAY PANEL FOR WAREHOUSE SHELVING UNITS

(71) Applicant: 54BLUE COMMUNICATIONS INC., Calgary (CA)

(72) Inventors: Jamie Calon, Calgary (CA); Mitch Patrick Dalsin, Calgary (CA); Leon Ivan Gonzalez Godinez, Calgary (CA); Joe Kou Tsai, Calgary (CA)

( * ) Notice: Subject to any disclaimer, the term of this patent is extended or adjusted under 35 U.S.C. 154(b) by 0 days.

(21) Appl. No.: 18/077,175

(22) Filed: Dec. 7, 2022

(65) Prior Publication Data

US 2024/0188732 A1 Jun. 13, 2024

(51) Int. Cl.
*A47F 5/00* (2006.01)
*G09F 7/18* (2006.01)

(52) U.S. Cl.
CPC .............. *A47F 5/0081* (2013.01); *G09F 7/18* (2013.01)

(58) Field of Classification Search
CPC ............ A47F 5/0081; A47F 2005/0075; A47F 3/043; A47B 47/03; G09F 7/18; G09F 2007/1804; G09F 2007/1813; G09F 2007/1817; G09F 2007/1826; G09F 7/20; A47G 5/00; E06B 1/526; E06B 9/01; E06B 9/04; E06B 2009/015; E06B 2009/002; E05D 7/12
USPC ........ 211/180, 191; 312/4, 262; 16/268, 382
See application file for complete search history.

(56) References Cited

U.S. PATENT DOCUMENTS 1,835,042 A * 12/1931 Hammer .................. A47G 1/02 248/225.11
4,118,827 A * 10/1978 Yamamoto ................ E05D 7/02 49/501
4,805,331 A * 2/1989 Boggess ............. G09F 15/0087 40/608
5,193,308 A * 3/1993 Davidian .................. E05D 7/12 16/382
5,407,263 A * 4/1995 Jones ..................... H02B 1/308 312/265.6
5,573,125 A * 11/1996 Denny ..................... B65G 1/02 211/183
5,940,937 A * 8/1999 Churchill ................. H02B 1/40 16/229
6,003,697 A * 12/1999 Ferchat ................. A47F 5/0081 211/186
6,079,081 A * 6/2000 Padiak ...................... G09F 7/18 16/334
6,425,488 B1 * 7/2002 Notohardjono ...... H05K 7/1495 361/829
6,971,197 B1 * 12/2005 Seiber .................. H05K 5/0204 40/606.15
7,191,907 B2 * 3/2007 Conway ................... B65G 1/02 182/138
7,571,516 B2 * 8/2009 Lueffe ..................... E05D 5/023 16/382

(Continued)

*Primary Examiner* — Jennifer E. Novosad

(57) ABSTRACT

A display assembly for mounting to warehouse shelving units, including a panel; and a hinge connected to the panel, the hinge having a connecting leaf configured to be removably attached to a vertical bar of the warehouse shelving unit; wherein the panel is movable between a covering position and a non-covering position. The display assembly provides a display assembly for warehouse shelving units that is widely adaptable to a variety of display media and warehouse shelving units.

5 Claims, 7 Drawing Sheets

(56) References Cited

U.S. PATENT DOCUMENTS

| | | | | |
|---|---|---|---|---|
| 7,581,768 | B2 * | 9/2009 | Balbo Di Vinadio | E05C 9/006 292/259 R |
| 8,616,387 | B2 * | 12/2013 | Romeiro | A47F 5/0081 211/183 |
| 10,450,795 | B2 * | 10/2019 | Raffi | E05B 65/0007 |
| 10,672,302 | B1 * | 6/2020 | Schultz | A47F 5/101 |
| 2002/0144966 | A1 * | 10/2002 | Calleja | F16P 1/00 211/183 |
| 2004/0182809 | A1 * | 9/2004 | Calleja | A47F 5/132 211/183 |
| 2006/0026876 | A1 * | 2/2006 | Murphy | G09F 15/0087 40/601 |
| 2007/0000092 | A1 * | 1/2007 | Geffe | E05D 7/123 16/382 |
| 2010/0079047 | A1 * | 4/2010 | Koh | A47B 88/988 312/348.3 |
| 2010/0117496 | A1 * | 5/2010 | Clarke | A47F 5/10 40/564 |
| 2020/0109732 | A1 * | 4/2020 | Costa | A47B 47/03 |
| 2023/0225065 | A1 * | 7/2023 | Sandnes | H05K 5/03 49/70 |

* cited by examiner

DISPLAY PANEL FOR WAREHOUSE SHELVING UNITS

FIELD OF THE INVENTION

This invention generally relates to a display panel and cover for warehouse shelving units.

BACKGROUND OF THE INVENTION

Industry standard warehouse shelving units, such as pallet racks, are open and exposed racks used for the storage of bulky and large volumes of goods. They are open at the front to allow for the ease of loading and unloading bulky volumes of goods on to the racks. Accordingly, such shelving units typically do not have any built in covers at the front of the shelves, lest they get in the way of the loading and unloading of goods. This is a missed opportunity as these shelving units can be used for other purposes in addition to the storage of goods, such as for the display of signs and advertising media.

Examples of some prior art assemblies used for attaching a sign to a pallet rack are described in U.S. Pat. No. 6,003,697 to Ferchat and U.S. patent application Ser. No. 10/768,258 to Calleja. Calleja describes a mesh curtain netting that can be attached to a rack and used to hang signs from. Ferchat describes a system wherein a sign assembly may be slid up and down (relative to the shelving unit) to reveal and hide goods stored on the shelving unit.

While Calleja and Ferchat provides an assembly for attaching signs to a pallet rack, each of them presents their own issues and shortcomings. For example, Calleja employs a curtain netting system, which would only be able to support lightweight signage or advertising media and not any heavier forms of media, such as a TV. Ferchat, in contrast, appears to provide a sturdier support assembly, however, the sign support body slides up and down relative to the shelving unit and therefore may present an obstacle to the ease and efficiency of removing the sign support body for loading and unloading bulky goods. These shortcomings are further exacerbated with advances in the technology used for signs and advertising displays. With the advent of electronic displays, magnetic media, etc., and more options for varying sizes and styles of shelving units, a more easily accessible, and adaptable system would be beneficial. Accordingly, it is now recognized that there is a need for an improved display assembly for warehouse shelving units that is simpler to attach, easier to move out of the way to provide access to the shelf behind it, and adaptable to both various forms of media for signs and advertising displays as well as various types of warehouse shelving units.

SUMMARY

The above shortcomings may be addressed by providing, in accordance with one aspect of the invention, a display assembly for warehouse shelving units. A display assembly for mounting to warehouse shelving units, including: a panel; and a hinge connected to the panel, the hinge having a connecting leaf configured to be removably attached to a vertical bar of the warehouse shelving unit; wherein the panel is movable between a covering position and a non-covering position.

In accordance with another aspect of the invention, the connecting leaf may include a right-angle bend configured to encase a corner of the vertical bar of the warehouse shelving unit.

In accordance with another aspect of the invention, the hinge may include a flat leaf and a spacer located between the flat leaf and connecting leaf, wherein the spacer spaces the flat leaf and connecting leaf apart in a manner that creates a gap between a backside of the panel and a frontside of the warehouse shelving unit. The spacer may include an extension to the flat leaf. The spacer may include an extension to the connecting leaf.

In accordance with another aspect of the invention, the hinge may be pivotally connected to the panel such that the panel may pivot relative to the hinge into a position where the panel may be horizontally aligned with a horizontal bar of the warehouse shelving unit. The panel may further include a first hinge aperture, and a second hinge aperture; the hinge may further include a flat leaf having a first end and a second end, a pivot aperture at the first end, and a slot at the second end; a first fastener may extend through the first hinge aperture and the pivot aperture; and a second fastener may extend through the second hinge aperture and the slot; wherein the second fastener may be secured in a multitude of positions within the slot thereby adjustably attaching the panel to the hinge.

In accordance with another aspect of the invention, the panel may include of a plurality of mounting apertures.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

Figure 1:
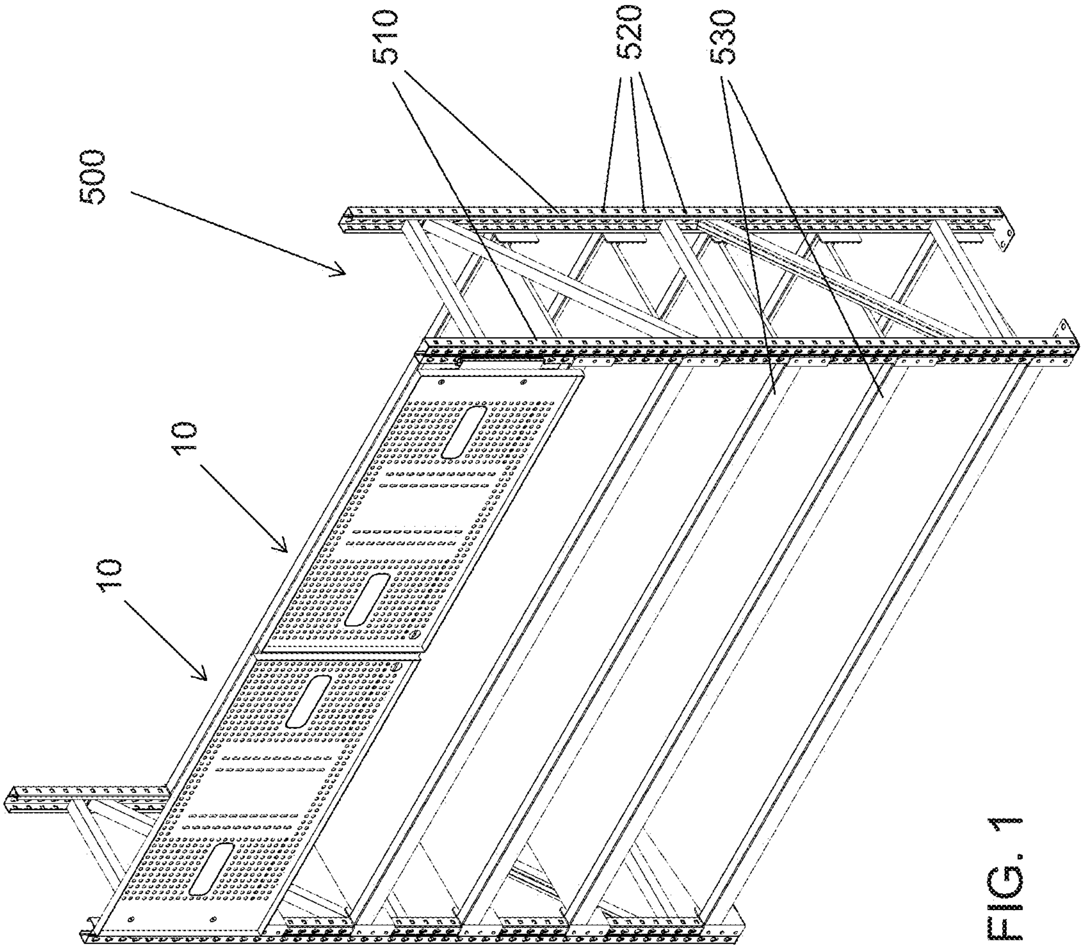
FIG. 1 is a perspective view of a display assembly according to an embodiment of the present invention shown mounted to a standard warehouse shelving unit.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the art and having possession of this disclosure, are to be considered within the scope of the invention as defined by the claims.

Figure 2:
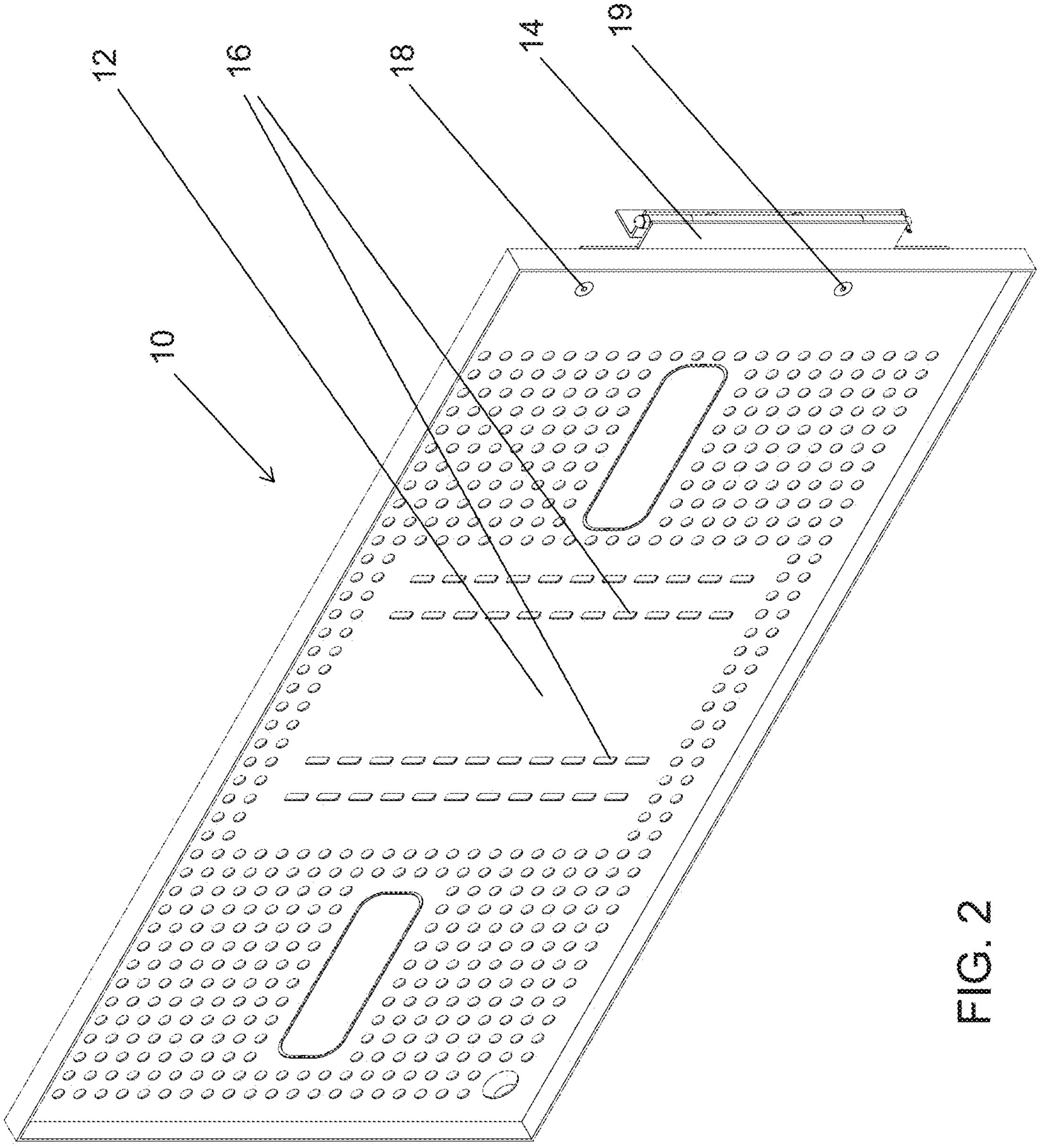
FIG. 2 is a perspective front view of the display assembly of FIG. 1.
Figure 3:
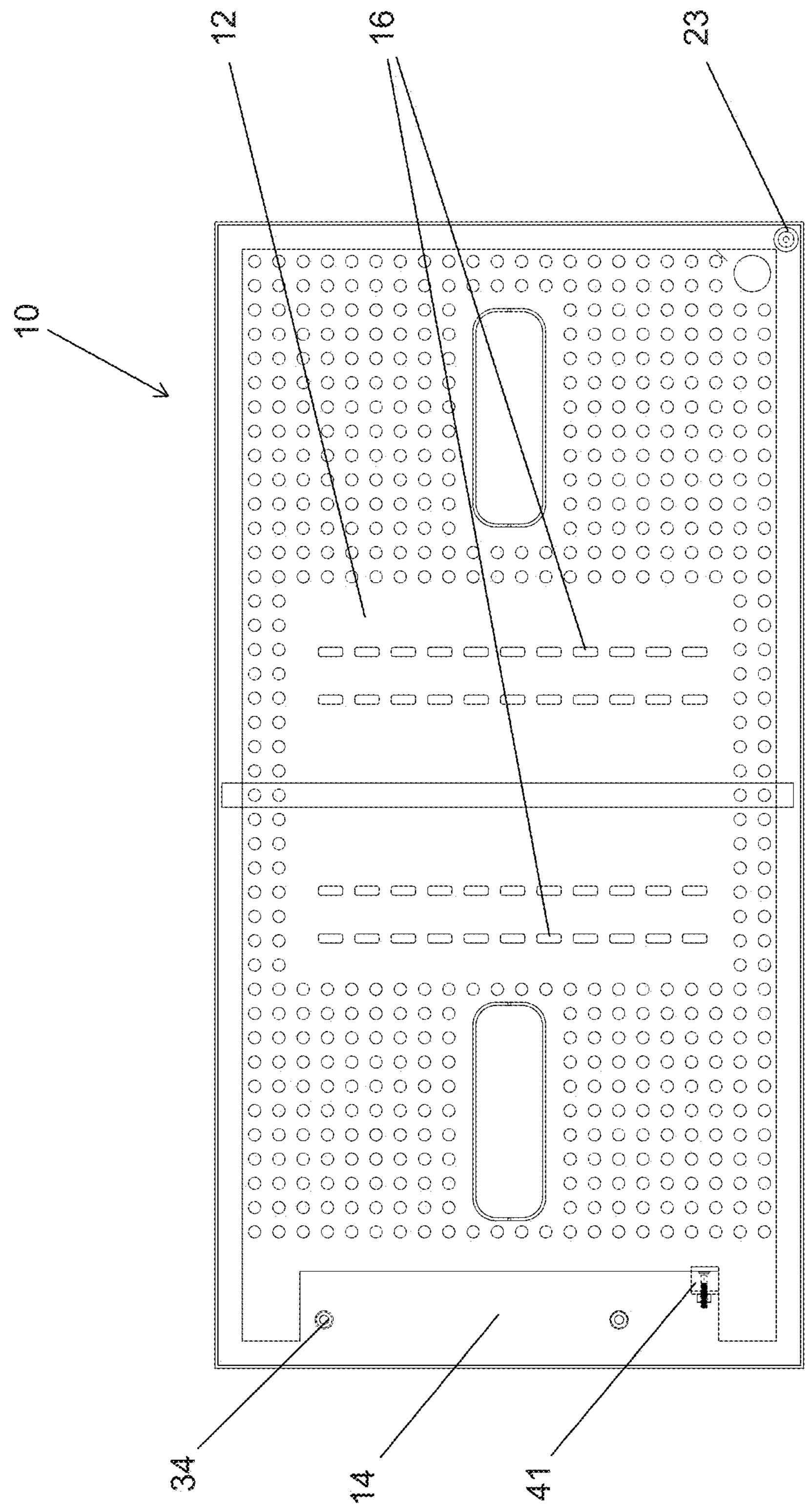
FIG. 3 is a back view of the display assembly of FIG. 1.
Figure 4:
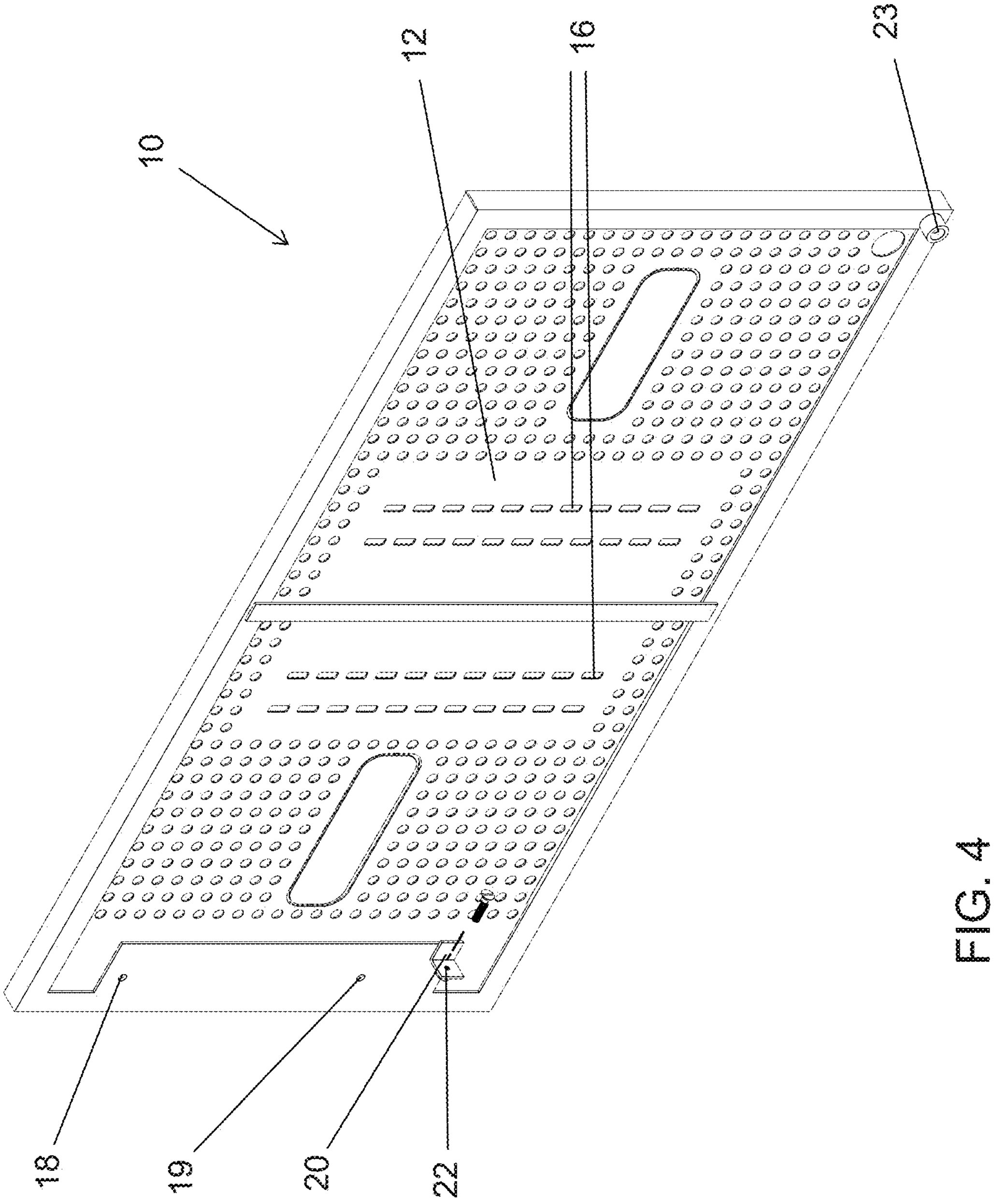
FIG. 4 is a perspective back view of the display assembly of FIG. 3, shown without the hinge attached.

Referring to FIGS. 1 to 3, the display assembly according to an embodiment of the invention is shown generally at 10. Display assembly 10 functions as a display panel and cover that can be removably mounted to a warehouse shelving unit 500. Referring to FIGS. 2 and 3, display assembly 10 includes a panel 12 connected to a hinge 14. Referring to FIGS. 2 and 4, panel 12 includes a plurality of mounting apertures 16, a first hinge aperture 18, a second hinge aperture 19, a first leveling bracket 20, and a magnet 23. The plurality of mounting apertures 16 are designed to allow for the mounting of various advertising media, including printed media and digital media, on to panel 12. Digital media may include TVs and other electronic display panels.

Accordingly, the plurality of mounting apertures 16 are arranged in a manner to meet Video Electronics Standards Association's (VESA) interface standards. Panel 12 also includes a number of apertures for the electronic cables of digital media to pass through as well as to serve the purpose of reducing the weight of panel 12. First hinge aperture 18 and second hinge aperture 19 are designed to accommodate a nut and bolt assembly, which are used to attach panel 12 to hinge 14 and to adjust the angle at which panel 12 attaches to hinge 14. First leveling bracket 20 is an L-shaped bracket with an aperture 22 designed to accommodate a nut and bolt assembly and used to adjust the angle at which panel 12 attaches to hinge 14. It is to be understood by a person skilled in the art that first leveling bracket 20 may also be a flat plate projecting from panel 12 or other structure fulfilling the same purpose. Magnet 23 is included on the backside of panel 12 on a corner opposite the side where hinge 14 attaches to panel 12. Magnet 23 may be of varying sizes and may extend from panel 12 to the extent required to connect with a shelf of a standard warehouse shelving unit 500. Magnet 23 removably couples panel 12 to horizontal bar 530 of warehouse shelving unit 500.

Panel 12 is preferably made of any ferromagnetic metal to allow for the magnetic attachment of signs and advertising media. However, panel 12 may be constructed of any other materials suitable for the type of sign or advertising media to be attached. Panel 12 may also be of various sizes and dimensions to fit various sizes of warehouse shelving units 500.

Figure 5:
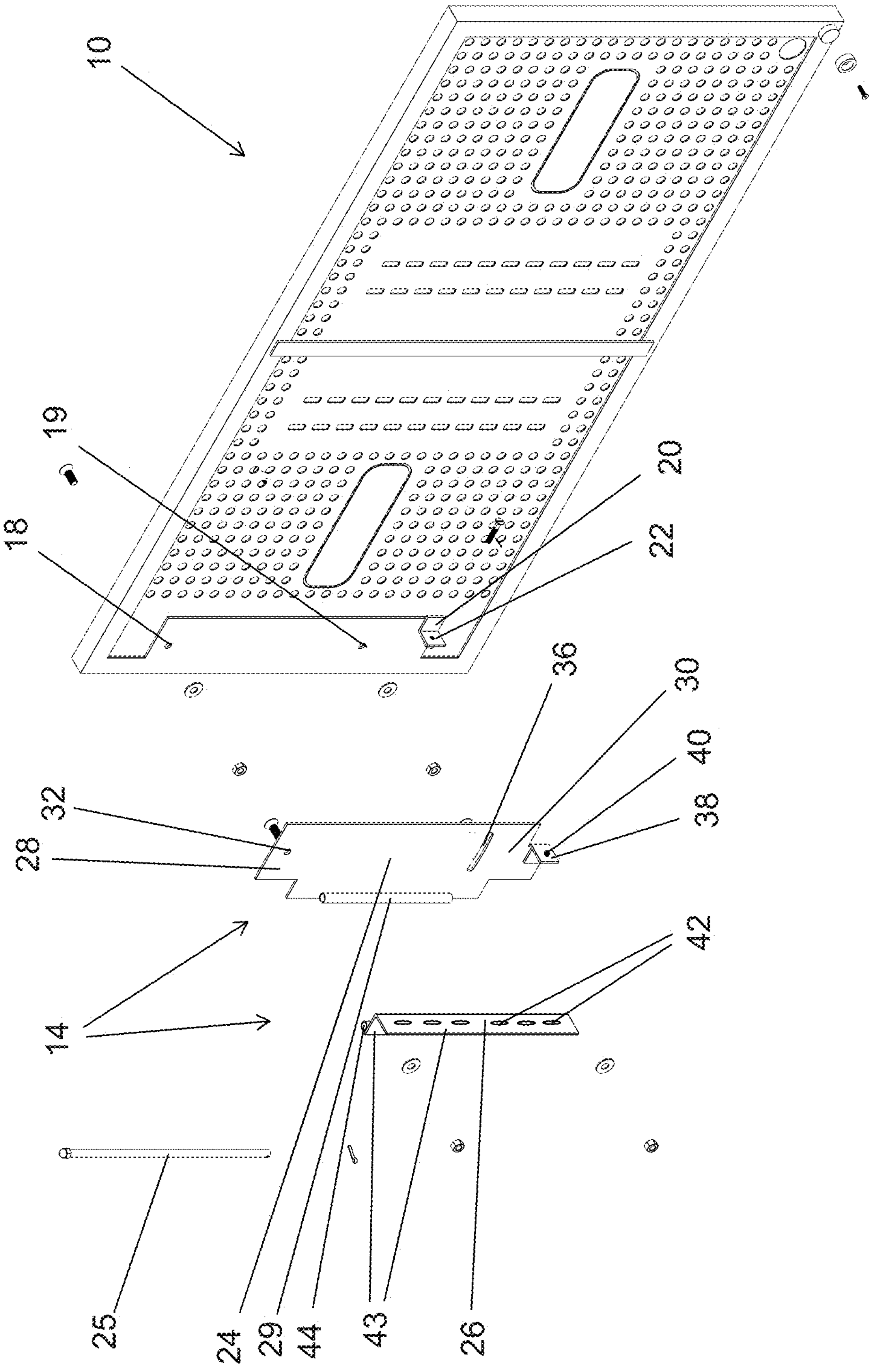
FIG. 5 is an exploded perspective back view of the display assembly of FIG. 3.

Referring to FIGS. 3 and 5, hinge 14 includes a flat leaf 24, a connecting leaf 26 and a hinge pin 25 connecting flat leaf 24 to connecting leaf 26. Connecting leaf 26 defines a right-angle for connecting to the vertical bars 510 of warehouse shelving unit 500. Flat leaf 24 includes a first end 28, a second end 30 and a hinge knuckle 29 extending between first end 28 and second end 30. First end 28 includes a pivot aperture 32, which is shaped, positioned, and sized to match and cooperate with first hinge aperture 18. Once a nut and bolt assembly is inserted through pivot aperture 32 and hinge aperture 18, a pivot point 34 is created. Pivot point 34 allows panel 12 to pivot relative to flat leaf 24. Accordingly, a suitable nut and bolt assembly is used to allow pivot point 34 to pivot as described. Second end 30 includes a slot 36 and a leveling bracket 38. Slot 36 is long, narrow, curved aperture sized and positioned to cooperate with second hinge aperture 19. Slot 36 has a curvature that inflects towards pivot point 34. A nut and bolt assembly is inserted through slot 36 and hinge aperture 19, and is used to adjust and lock panel 12 to and in a desired position relative to flat leaf 24. Second leveling bracket 38 is designed to cooperate with first leveling bracket 20, and is an L-shaped bracket with an aperture 40, which is designed to accommodate a nut and bolt assembly. A nut and bolt assembly secured through first leveling bracket 20 and second leveling bracket 38 forms a leveler 41, which is used to adjust the angle at which panel 12 attaches to flat leaf 24.

While slot 36 is illustrated as a narrow, curved aperture, it will be understood by a person skilled in the art that slot 36 may be of any size and shape that may allow for adjusting the position of panel 12 relative to flat leaf 24 and for the fastening of flat leaf 24 to panel 12 at the desired position. For example, it may be a square shaped slot, which would allow for panel 12 to be positioned and locked into a desired position with a suitably sized nut, bolt and washer assembly. Further, it is to be understood by a person skilled in the art that second leveling bracket 38 may also be a flat plate projecting from flat leaf 24 or other structure fulfilling the same purpose.

Connecting leaf 26 is a hinge leaf that includes one or more members 43, a plurality of apertures 42 and a hinge knuckle 44. Hinge knuckle 44 is configured to align with hinge knuckle 29 to enable hinge pin 25 to slide therethrough. One or more members 43 includes two perpendicular members 43, or alternatively is a single member 43 bent at a right angle, to provide added structural support, stabilization capabilities, weight bearing capabilities, and stress reduction on hardware to display assembly 10. However, it will be understood by a person skilled in the art that connecting leaf 26 may be flat or in another shape or form. By way of example, connecting leaf 26 may be rounded or curved to accommodate a vertical bar 510 in the shape of a rounded column. It will further be understood by a person skilled in the art that while connecting leaf 26 is described as including two perpendicular members 43, connecting leaf 26 may also include three perpendicular members 43 and that each perpendicular member 43 may be of different widths and depths. The third perpendicular members 43 or a perpendicular member 43 of a greater width forms a spacer that spaces flat leaf 24 and connecting leaf 26 apart in a manner that creates a gap between a backside of the panel and frontside of the warehouse shelving unit. For example, right-angle leaf 46 may include two perpendicular members 43, one of which is wider than the other, forming an extension to connecting leaf 26, such that a gap exists between panel 12 and the front face of warehouse shelving unit 500, once display assembly 10 is mounted to warehouse shelving unit 500. Such an arrangement would allow display assembly 10 to be mounted to warehouse shelving unit 500 with a gap between the front face of warehouse shelving unit 500 and the back face of panel 12. Such an arrangement is beneficial in that it accommodates for goods that may not be stored in a manner that is flush against the front face of warehouse shelving unit 500 and that instead protrudes from and extends beyond the front face of warehouse shelving unit 500. Apertures 42 are sized, shaped, and positioned to cooperate with the type of warehouse shelving unit 500 that display assembly 10 is desired to be mounted on. Accordingly, apertures 42 may vary in number, size, and shape to fit and accommodate a number of warehouse shelving units 500. Connecting leaf 26 is removably mounted to a vertical bar 510 of a warehouse shelving unit 500 via apertures 42, shelving unit apertures 520 and suitable fastening mechanisms, such as a nut and bolt assembly.

While in the present embodiment a nut and bolt assembly is used to attach panel 12 to hinge 14, panel 12 may be connected to hinge 14 in any other manner that would be apparent to a person skilled in the art.

To assemble display assembly 10, a user first mounts right angle leaf 26 to vertical bar 510 of warehouse shelving unit 500. This is done by securing and tightening a nut and bolt assembly, or any other suitable fastener, through apertures 42 of connecting leaf 26 and the corresponding shelving unit apertures 520 of vertical bar 510. The user then mounts flat leaf 24 to panel 12 by securing and tightening the nut and bolt assemblies, or other suitable fasteners, through first hinge aperture 18 and pivot aperture 32, and second hinge aperture 19 and slot 36. At this point, if desired, the user may mount a TV or other electronic media to panel 12, using mounting apertures 16 and suitable fasteners. Once flat leaf 24 is mounted to panel 12 (and any electronic media is mounted as desired), flat leaf 24 is then connected to connecting leaf 26 on vertical bar 510 by inserting and securing hinge pin 25 though hinge knuckle 29 on flat leaf 24 and hinge knuckle 44 on connecting leaf 26. Hinge pin 25 is then secured with a cotter pin. Once connecting leaf 26 is connected to flat leaf 24 to form hinge 14, the user may then adjust the angle at which panel 12 is attached to hinge 14 to align a horizontal edge of panel 12 with horizontal bar 530 of warehouse shelving unit 500 or to align a vertical edge of panel 12 with a vertical edge of an adjacent panel 12. The angle at which panel 12 is attached to hinge 14 may be adjusted by first loosening the nut and bolt assembly secured through the second hinge aperture 19 and slot 36, which will loosen the attachment of panel 12 to hinge 14. Then, the user may tighten or loosen the nut and bolt assembly secured through first leveling bracket 20 and second leveling bracket 38 to pull first leveling bracket 20 closer to second leveling bracket 38. In doing so, the user adjusts the angle at which panel 12 is aligned with flat leaf 24, and causes the nut and bolt assembly in slot 36 to slide along slot 36 accordingly. Once panel 12 is moved into the desired position relative to flat leaf 24, the nut and bolt assembly secured through slot 36 and second hinge aperture 19 may be tightened to lock in the desired position. In doing so, panel 12 is locked into an orientation where a horizontal edge of panel 12 is in parallel alignment with horizontal bar 530 of warehouse shelving unit 500. Alternatively, panel 12 may be adjusted into an orientation where a vertical edge of panel 12 is in parallel alignment with the vertical edge of an adjacent panel 12 to form a flush and cohesive cover over the shelf of warehouse shelving unit 500.

It is to be understood by a person skilled in the art that while the above described method of assembly is a preferred order of assembly, the steps may be carried out in a number of ways and a different order of assembly is possible for display assembly 10. For example, a user may mount any form of printed or electronic commercial or advertising media to panel 12 after display assembly 10 has been mounted to warehouse shelving unit 500.

In operation, once display assembly 10 has been assembled and mounted to warehouse shelving unit 500 (as described above), a user may easily mount or switch out any form of printed or other lightweight advertising media to panel 12 as desired. For example, magnetic posters may be directly magnetized to the metal panel 12 and other printed media may be fastened or removably adhered on to panel 12. Once the desired commercial or advertising media has been mounted to panel 12, display assembly 10 acts as both an effective commercial advertising space that can be used to advertise various goods to the user's customers and to hide or conceal the merchandise or goods stored behind panel 12 on warehouse shelving unit 500. Display assembly 10 also permits access to the goods stored behind it by simply opening or pulling panel 12 towards the user (and away from the shelf) and rotating it aside and out of the way of the user. Hinge 14 would permit panel 12 to swing fully open (at least 90 degrees or more from its staring position) to reveal and provide access to the goods stored behind it. Attaching display assembly 10 to the vertical or upright bar of the warehouse shelving unit 500 allows a user to easily and effectively move display assembly 10 out of the way of loading and unloading goods. There is no need to lift what may be a heavy display assembly (with TVs attached) upwards and find a suitable locking mechanism that may be able to sustain the weight of the load.

Figure 6:
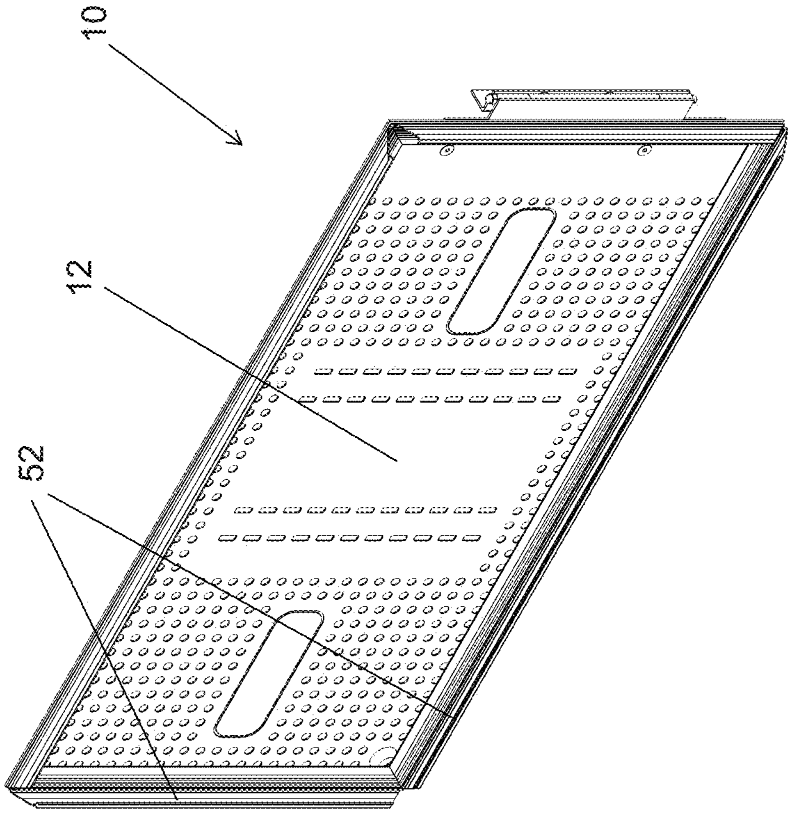
FIG. 6 is a perspective front view of a display assembly according to another embodiment of the present invention.

Referring to FIG. 6, another embodiment of the present invention is shown. In this embodiment panel 12 includes a snap frame 52. Snap frame 52 may be any commercially available, pre-fabricated snap frame addition that includes a spring lock mechanism that allows a user to clip and unclip the edges of the frame. By way of example, a commercially available, pre-fabricated snap frame 52 may be the SECO™ snap frame. However, it is to be understood by a person skilled in the art that other snap frames may be used. Attaching snap frame 52 onto panel 12 allows a user to easily secure and remove a variety of printed media without having to take display assembly 10 down from warehouse shelving unit 500.

Figure 7A:
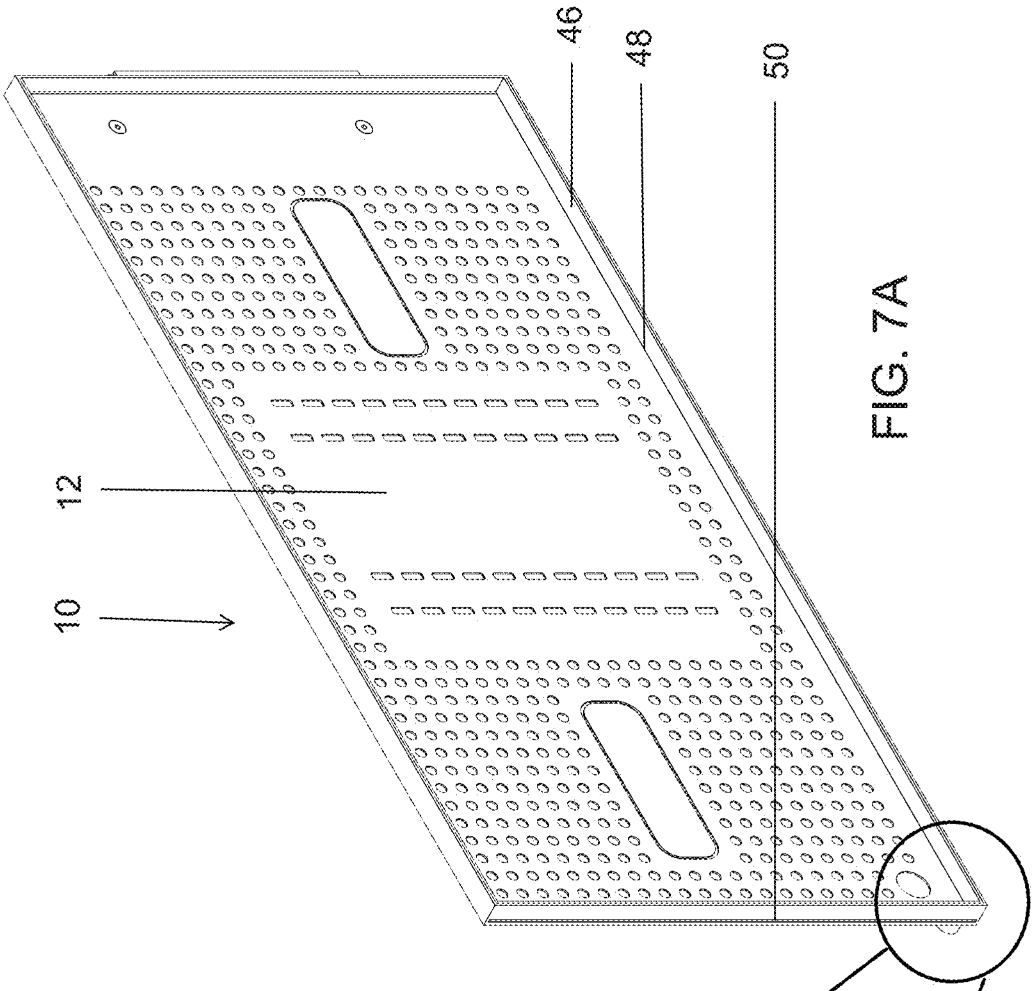
FIG. 7A is a perspective front view of a display assembly according to another embodiment of the present invention.
Figure 7B:
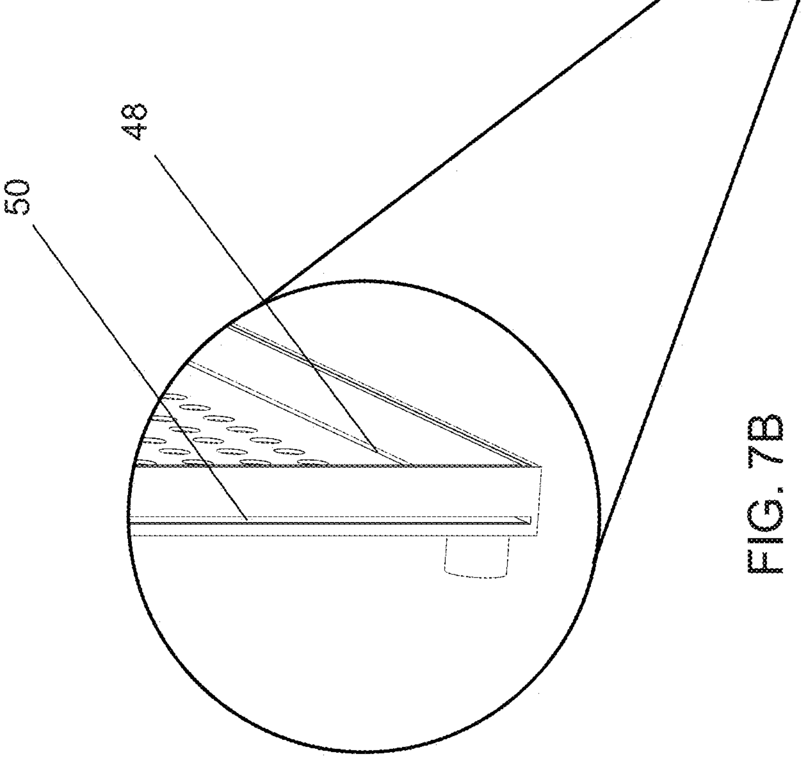
FIG. 7B is a close up view of a section of the display assembly of FIG. 7A showing the frame slot and channel.

Referring to FIGS. 7A and 7B, another embodiment of the present invention is shown. In this embodiment panel 12 includes a frame 46 extending along the perimeter of panel 12. Frame 46 overhangs panel 12 on the frontside of panel 12 and includes a channel 48 and a frame slot 50. Channel 48 is a long, narrow groove that runs along the perimeter of the interior of frame 12. Channel 48 may be used to hold printed media within frame 46. Frame slot 50 is a long, narrow aperture on the side of frame 46 that is opposite from hinge 14. Frame slot 50 is sized and shaped to allow for printed media to slide through and to be inserted into channel 48. While frame slot 50 is preferably located on the side of frame 46 that is opposite from hinge 14, it is to be understood by a person skilled in the art, that frame slot 50 could be located on any side of frame 46.

The above-described display assembly for warehouse shelving units is mounted to the upright bar of a warehouse shelving unit. This is advantageous because it allows the display assembly to be moved completely out of the way of the user with ease to provide full accessibility to the goods stored behind the display assembly on the warehouse shelving unit's shelf, while providing a medium for the display of signs and advertising media. The angle or tilt at which the display assembly may be mounted to the shelf is also adjustable, which accommodates for upright bars that are not perfectly upright or parallel to each other. The display assembly may also be easily mounted to a variety of warehouse shelving units without complex installation procedures. The display assembly may also act as a mechanism used to lock up goods stored behind it to prevent unwanted access to the goods. Lastly, the display assembly may act as a physical barrier to dissuade or prevent individuals from climbing up the shelves of warehouse shelving units, which is often dangerous and undesirable.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. A display assembly for mounting to warehouse shelving units, comprising:

a panel having a first hinge aperture and a second hinge aperture; and a hinge connected to the panel, the hinge comprising a connecting leaf and a flat leaf, the flat leaf having a first end and a second end, a pivot aperture at the first end, and a slot at the second end;

a first fastener extending through the first hinge aperture and the pivot aperture, the first fastener comprising a pivot point;

a second fastener extending through the second hinge aperture and the slot;

wherein the panel is movable between a covering position and a non-covering position and rotatable about the pivot point, and the second fastener is securable in a multitude of positions within the slot and adjustably attaches the panel to the flat leaf in a desired position relative to the pivot point.

2. The display assembly of claim 1, wherein the connecting leaf comprises a right-angle bend configured to encase a corner of the vertical bar of the warehouse shelving unit.

3. The display assembly of claim 1, wherein the hinge further comprising a flat leaf and a spacer located between the flat leaf and connecting leaf, wherein the spacer spaces the flat leaf and connecting leaf apart in a manner that creates a gap between a backside of the panel and a frontside of the warehouse shelving unit.

4. The display assembly of claim 3, wherein the spacer comprises an extension to the connecting leaf.

5. The display assembly of claim 1, wherein the panel further comprises of a plurality of mounting apertures.

* * * * *